(12) United States Patent
Williams, Jr. et al.

(10) Patent No.: US 12,008,885 B2
(45) Date of Patent: Jun. 11, 2024

(54) WASHROOM USE DETERMINATION SYSTEM

(71) Applicant: Kimberly-Clark Worldwide, Inc., Neenah, WI (US)

(72) Inventors: Frederick J. Williams, Jr., Cumming, GA (US); Reilly Howell, Atlanta, GA (US); Babak R. Ghazi, Smyrna, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 467 days.

(21) Appl. No.: 17/256,495

(22) PCT Filed: Jun. 26, 2019

(86) PCT No.: PCT/US2019/039164
§ 371 (c)(1),
(2) Date: Dec. 28, 2020

(87) PCT Pub. No.: WO2020/006034
PCT Pub. Date: Jan. 2, 2020

(65) Prior Publication Data
US 2021/0280043 A1    Sep. 9, 2021

Related U.S. Application Data

(60) Provisional application No. 62/691,866, filed on Jun. 29, 2018.

(51) Int. Cl.
G08B 21/24    (2006.01)
G01J 5/00     (2022.01)
H04N 5/33     (2023.01)

(52) U.S. Cl.
CPC ......... *G08B 21/245* (2013.01); *G01J 5/0025* (2013.01); *G01J 5/0066* (2013.01); *H04N 5/33* (2013.01); *G01J 2005/0077* (2013.01)

(58) Field of Classification Search
CPC .................. A47K 2010/3226; H04L 12/2803
(Continued)

(56) References Cited

U.S. PATENT DOCUMENTS

| 9,170,720 B2 | 10/2015 | Plate et al. |
| 10,292,544 B1 * | 5/2019 | Bonner ................. A47K 10/38 |

(Continued)

FOREIGN PATENT DOCUMENTS

| CN | 101223694 A | 7/2008 |
| CN | 101234006 A | 8/2008 |

(Continued)

OTHER PUBLICATIONS

Hassan, Fayaz, "Infrared Sensor Bases Power Saver", electronicsforu.com, https://www.electronicsforu.com/electronics-projects/hardware-diy/infrared-sensor-based-power-saver, Jan. 3, 2016.

(Continued)

*Primary Examiner* — Fabricio R Murillo Garcia

(57) ABSTRACT

A system having a washroom controller configured to communicate with one or more hygiene dispensers in the washroom; a thermal sensor configured detect thermal events at the entrance and communicate data describing the thermal events to the washroom controller; and a data processing apparatus configured to access the data from the washroom controller and analyze the data to determine a number of thermal events over a given time period and a number of dispenses from the at least one of the one or more hygiene dispensers.

10 Claims, 3 Drawing Sheets

(58) Field of Classification Search
USPC .................................................... 340/573.1
See application file for complete search history.

(56) References Cited

U.S. PATENT DOCUMENTS

| | | | |
|---|---|---|---|
| 2003/0030562 A1* | 2/2003 | Lane ..................... | G16H 40/20 |
| | | | 340/573.4 |
| 2005/0171634 A1 | 8/2005 | York et al. | |
| 2009/0119142 A1 | 5/2009 | Yenni et al. | |
| 2010/0268381 A1* | 10/2010 | Goerg ............... | A47K 10/3845 |
| | | | 700/244 |
| 2010/0315244 A1 | 12/2010 | Tokhtuev et al. | |
| 2011/0291841 A1 | 12/2011 | Hollock et al. | |
| 2015/0022025 A1 | 1/2015 | Lee et al. | |
| 2015/0088570 A1 | 3/2015 | Yenni et al. | |
| 2015/0206077 A1 | 7/2015 | Himmelmann et al. | |
| 2015/0207275 A1 | 7/2015 | Wegelin et al. | |
| 2017/0032657 A1* | 2/2017 | Gaisser ................... | H04N 5/33 |
| 2017/0192402 A1 | 7/2017 | Karp et al. | |
| 2017/0206771 A1* | 7/2017 | Hermann ............. | G08B 21/245 |
| 2018/0075375 A1* | 3/2018 | Becker .................. | G06Q 10/20 |
| 2018/0306869 A1* | 10/2018 | Erickson ............ | G01R 31/3835 |
| 2019/0147731 A1* | 5/2019 | Herdt .................. | A47K 5/1217 |
| | | | 340/573.1 |

FOREIGN PATENT DOCUMENTS

| | | |
|---|---|---|
| CN | 104731048 A | 6/2015 |
| CN | 205103612 U | 3/2016 |
| CN | 205658839 U | 10/2016 |
| GB | 2425388 A | 10/2006 |
| JP | 11223552 A | 8/1999 |
| JP | 2002148354 A | 5/2002 |
| JP | 2006169807 A | 6/2006 |
| JP | 2007127338 A | 5/2007 |
| KR | 20120012021 A | 2/2012 |

OTHER PUBLICATIONS

Yazar et al., "Multi-sensor ambient assisted living system for fall detection", In Proceedings of the IEEE international conference on acoustics, speech, and signal processing (ICASSP'14), 1-3, 2014.
Popsescu et al., "VAMPIR-an automatic fall detection system using a vertical PIR sensor array" 2012 6th International Conference on Pervasive Computing Technologies for Healthcare (PervasiveHealth) and Workshops, San Diego, CA, USA, 2012, pp. 163-166, doi: 10.4108/icst.pervasivehealth.2012.248759.
Amin et al., "Driver tracking and posture detection using low-resolution infrared sensing", Proceedings of the Institution of Mechanical Engineers, Part D: Journal of Automobile Engineering 221, No. 9 (2007): 1079-1088.
Berger et al., "Room occupancy measurement using low-resolution infrared cameras", IET Irish Signals and Systems Conference (ISSC 2010), 249-254, book e-ISBN : 978-1-84919-252-1, DOI 10.1049/cp.2010.0521.
Budzan et al., "Remarks on noise removal in infrared images", Measurement Automation Monitoring, vol. 61, No. 6 (2015): 187-190.
Kraus et al., "Infrared Imaging of Capella with the IOTA Closure Phase Interferometer", The Astronomical Journal 130, No. 1 (2005): 246-255, https://iopscience.iop.org/article/10.1086/430456/meta.
Fan et al., "Noise suppression and details enhancement for infrared image via novel prior", Infrared Physics & Technology 74 (2016): 44-52, https://www.sciencedirect.com/science/article/abs/pii/S1350449515002698.
Meng, J., "Edge enhancement and noise suppresion for infrared image based on feature analysis", Infrared Physics & Technology, vol. 9, Jun. 2018, pp. 142-152, https://doi.org/10.1016/j.infrared.2018.04.005.

* cited by examiner

WASHROOM USE DETERMINATION SYSTEM

This application claims priority from U.S. provisional Patent Application Ser. No. 62/691,866 filed on 29 Jun. 2018, the entire contents of which are incorporated herein by reference.

TECHNICAL FIELD

This disclosure relates to determining washroom use and traffic.

Washroom traffic data can be used to determine how often and when a washroom should be serviced based on the level of use inferred from the traffic data. Such data can also be used to understand occupant traffic patterns in a building including which floors or areas are more heavily used than others. In any case, washroom traffic information can be determined through the use of door counters, which are devices mounted on the door, doorframe or both, and sense when the door opens/closes. This requires that each door have such a sensor, which can be costly.

Further, some washrooms do not have entrance/exit doors but rather open passageways through which occupants must navigate to enter or leave the washroom. In these types of washrooms door counters are not suitable, which makes washroom traffic more difficult to determine.

SUMMARY OF THE DISCLOSURE

In general, the subject matter of this specification relates to determining washroom traffic.

In general, one aspect of the subject matter described in this specification can be implemented in systems that include a washroom controller configured to communicate with one or more hygiene dispensers in the washroom; a thermal sensor configured detect thermal events at the entrance and communicate data describing the thermal events to the washroom controller; and a data processing apparatus configured to access the data from the washroom controller and analyze the data to determine a number of thermal events over a given time period and a number of dispenses from the at least one of the one or more hygiene dispensers (e.g., over that same time period). Other embodiments of this aspect include corresponding methods, apparatus, and computer program products.

Yet another aspect of the subject matter described in this specification can be implemented in methods that include communicating, from a hygiene dispenser in a washroom to a washroom controller, use data describing dispense events from the hygiene dispenser, wherein a dispense event defines an actuation of the dispenser to dispense consumable product; detecting, by a thermal sensor, thermal events proximate an entrance of the washroom; communicating, from the thermal sensor to the washroom controller, thermal data describing the thermal events; analyzing the use data and thermal event data to determine a number of dispense events and a number of occupants that entered in the washroom; and displaying the number of dispense events and occupants. Other embodiments of this aspect include corresponding systems, apparatus, and computer program products.

A further aspect of the subject matter described in this specification can be implemented in methods that include communicating, from a hygiene dispenser in a washroom to a washroom controller, use data describing dispense events from the hygiene dispenser, wherein a dispense event defines an actuation of the dispenser to dispense consumable product; detecting, by a thermal sensor, thermal events proximate an entrance of the washroom; communicating, from the thermal sensor to the washroom controller, thermal data describing the thermal events; analyzing the use data and thermal event data to determine a number of dispense events and a number of occupants that entered in the washroom; and comparing the number of dispense events to the number of occupants; and in response to determining that the number of occupants differs from the number of dispense events by a predetermined measure, providing a communication specifying that the hygiene dispenser may be malfunctioning. Other embodiments of this aspect include corresponding systems, apparatus, and computer program products.

Particular embodiments of the subject matter described in this specification can be implemented so as to realize one or more of the following advantages. For example, separate and discrete door counters are not needed for every entrance and/or exit as the washroom system described herein can, from a single washroom location such as centrally mounted in the washroom ceiling, thermally detect temperature changes at multiple entrances and/or exits by having thermal sensors aimed at those areas with each thermal event indicating an occupant entered or left the washroom. Having such a thermal detection device avoids not only the multiple door counters (and associated costs) but also the complexity associated with retrieving data from those remote door counters.

Some washrooms do not have entrance/exit doors but rather open passageways, for example, with ninety degree bends (for privacy). In these washrooms using traditional door counters is not even an option. Because the washroom system described herein uses a thermal sensor such a system can determine traffic in these open passageways washrooms because it does not depend on door opening or closing events to determine such traffic.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF DRAWINGS

Like reference symbols in the various drawings indicate like elements.

DETAILED DESCRIPTION OF THE DISCLOSURE

The present disclosure relates to determining washroom traffic and use. The washroom traffic system includes a washroom controller that can communicate with the various dispensers in the washroom and the thermal sensor. For example, the thermal sensor can be in the washroom controller, which is mounted on the ceiling of the washroom. The thermal sensor detects thermal variations or thermally warm spots in the washroom. A data processing apparatus in communication with the washroom controller can access the thermal data and infer the presence of occupants entering or existing the washroom based on heat signatures of the occupants proximate the door or entry/exit to the washroom and determine the number of washroom dispenser dispenses to give a holistic view of the washroom use. The washroom use determination system is described in additional detail below.

Figure 1:
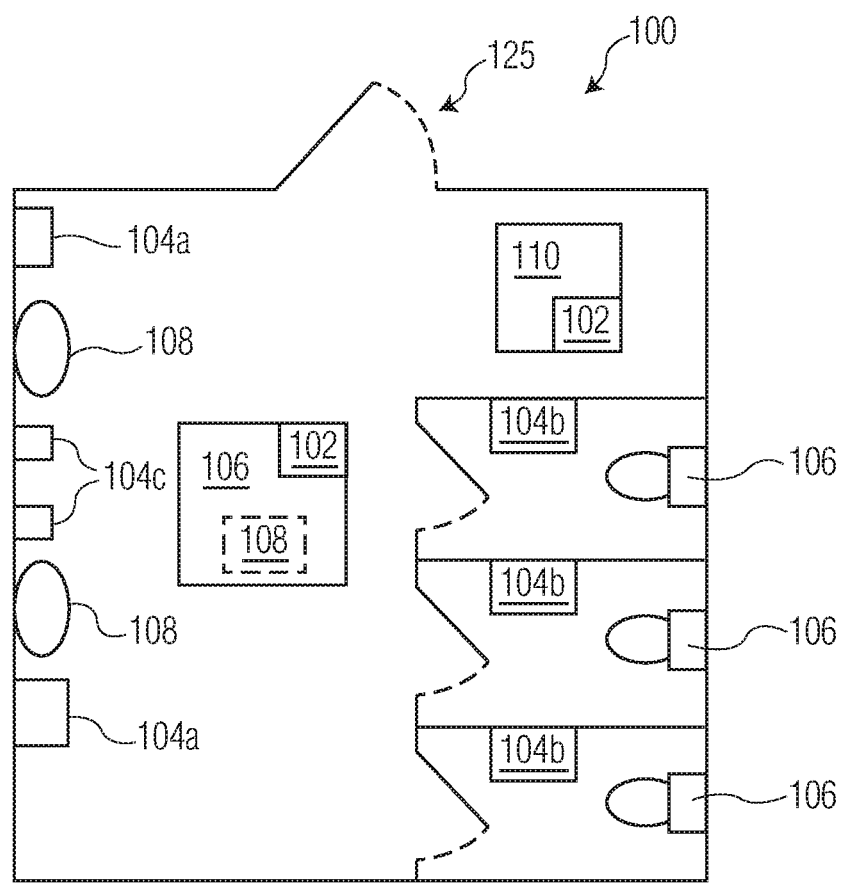
FIG. 1 is a block diagram of an example environment in which a washroom use determination system can be implemented.

FIG. 1 is a block diagram of an example environment 100 in which a washroom use determination system 102 can be implemented. The environment 100 can be, for example, a semi-private or public washroom or break room or another space in which dispensers 104 and, optionally, equipment such as toilets 106 and/or sinks 108, are located. The dispensers 104 can include, for example, hand towel dispensers 104a, bath tissue dispensers 104b, hand soap (or other cleansing) dispensers 104c, hand or facial care dispensers (not pictured), and the like. In some implementations, one or more of the dispensers 104 are hygiene-based dispensers. A hygiene dispenser 104 dispenses consumable hygiene product (e.g., bath tissue, hand towels, hand sanitizer, soap, lotion, deodorizer, air freshener, etc.), which is a product intended to promote good hygiene or sanitation such as by cleaning or sanitizing a user and/or a surface. In some implementations, a dispenser 104, more generally, is a device that holds consumable (hygiene) product and dispenses the product in response to a stimulus, e.g., an environmental stimulus (e.g., light/darkness), at pre-determined (e.g., programmatically set) intervals or by manual user actuation such as pulling an exposed portion of the consumable product or via a pumping-type process (e.g., for some manual soap dispensers).

The washroom use determination system 102 can be used to determine traffic in the environment 100, e.g., number of occupants at any one time in the environment 100 or the number of occupants entering and/or exiting the environment 100 over a given time period. The system 102 can also determine the number of dispenser 104 dispenses over a given time period including when such dispensing events occurred.

To this end, the system 102 includes a washroom controller 106, a thermal sensor 108 and a data processing apparatus 110. The washroom controller 106 communicates, e.g., over wired or wireless channels, with the dispensers 104 and the thermal sensor 108 to, for example, instruct the operation of the dispenser 104 and/or sensor 108. The controller 106 also receives data from the dispensers 104 describing the dispensing events (e.g., an actuation of the dispenser 104 causing consumable product to be dispensed to a user) of the dispensers 104 (e.g., the number of dispense events over a given time period and the time of such dispensing events or the number and times of dispensing events since the last report provided to the controller 104) and thermal event data from the sensor 108.

Figure 2:
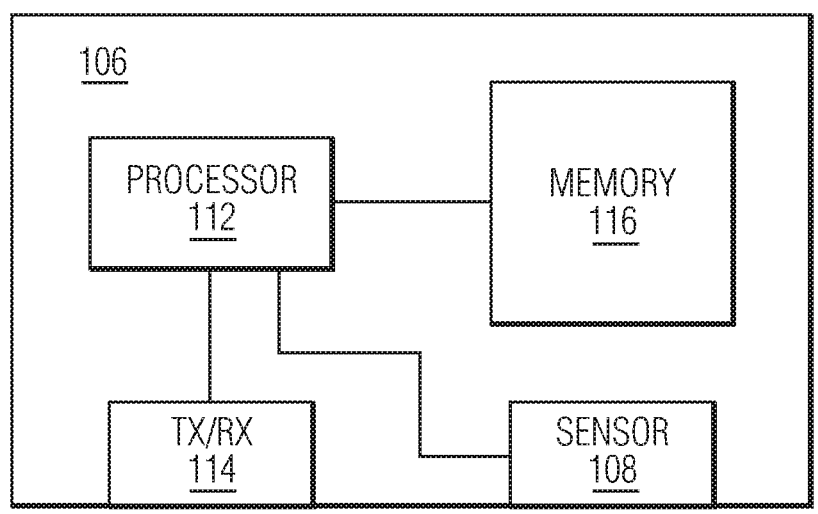
FIG. 2 is a block diagram of an example washroom controller.

FIG. 2 is a block diagram of an example washroom controller 106. In some implementations, the controller 106 includes a processor 112 (e.g., a microcontroller or a microprocessor), a transceiver 114, and a memory storage device 116 (e.g., volatile and/or non-volatile memory). The transceiver 114, at the direction of the processor 112, for example, communicates with the dispensers 104 and thermal sensor 108 to receive data describing the operation or state of the each. The controller 104, through use of the processor 112, can store such data in the memory storage device 116 for use or later access. The memory storage device 116 can store programmatic instructions to control or instruct the operation of the controller 106.

Figure 3A:
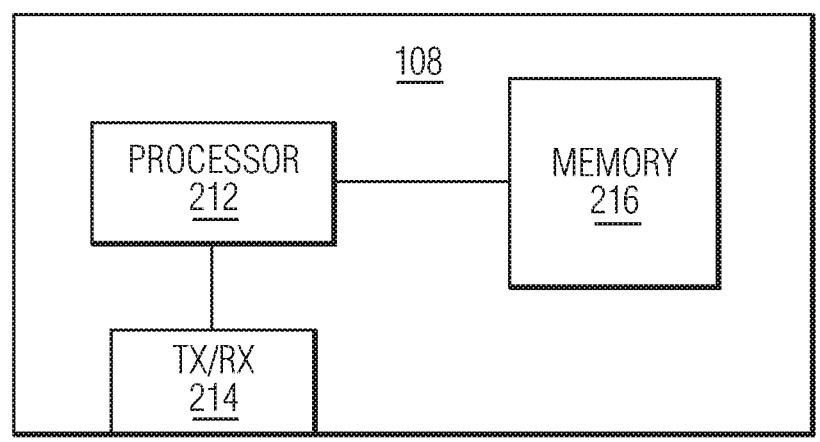
FIG. 3A is a block diagram of an example thermal sensor.

FIG. 3A is a block diagram of an example thermal sensor 108. In some implementations the thermal sensor 108 includes a processor 212 (e.g., a microcontroller or a microprocessor), a transceiver 214, and a memory storage device 216 (e.g., volatile and/or non-volatile memory). In some implementations (e.g., in which the sensor 108 is co-located with the controller 106) the thermal sensor 108 shares or otherwise is benefited from the processor 112, memory 116 and/or the transceiver 114 of the controller 106 and may not have a processor 212, memory 216 and/or the transceiver 214.

The thermal sensor 108 detects thermal events in the environment 100, e.g., at the entrance and/or exit of the environment 100. The entrance/exit can be a door or open passageway, e.g., an opening into the environment without a door such as a short corridor having a left or right turn to prevent an outside observer from readily seeing into the environment 100. A thermal event is a change in the thermal status or state (e.g., a temperature change) of a portion of the environment 100. For example, a thermal event at the entrance 125 occurs when an occupant dwells at or passes through the entrance 125 as the occupant presents a thermal change (e.g., thermal increase) at the entrance 125 by her presence there, as opposed to the entrance 125 having a different (e.g., lower) thermal characteristic without the presence of the occupant.

The thermal sensor 108 can be, for example, an infrared thermal sensor or sensor array (e.g., based on thermopile elements in an array such as an 8×8 grid) (see generally, Tracking Motion and Proxemics using Thermal-sensor Array, Basu and Rowe, Carnegie Mellon University. 2014, which is hereby incorporated by reference in its entirety). In some implementations, other types of sensors can be used to determine traffic such as pyroelectric sensors.

Figure 3B:
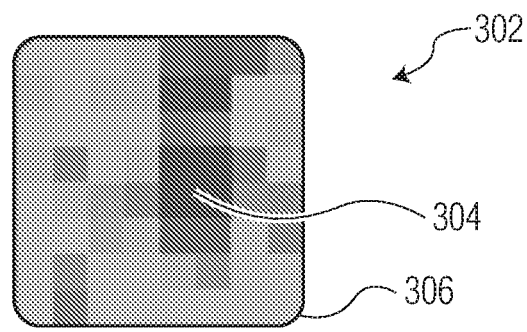
FIG. 3B is a representation of example visualized thermal data.

FIG. 3B is a representation 302 of example visualized thermal data, for example, as captured by the thermal sensor 108 of a portion of the environment 100 (e.g., a plan or top-down view of the environment 100). The darker sections (e.g., pixel 304) represent areas in the environment 100 that have an elevated or higher thermal signature (e.g., temperature) as compared to lighter sections (e.g. pixel 306). Based on the positioning of the thermal sensor 108 and the size and layout of the environment 100 the representation (e.g., 302) can capture all of the environment 100 or only a positon thereof. The sections (e.g., pixels) of the representation 302 can be correlated with actual, physical locations in the environment 100. Thus the representation 302 shows a gradient of thermal states (e.g., temperatures) across the environment 100. For example, the gradient could be from 100 degrees Fahrenheit to 80 degrees Fahrenheit. The gradient can be set as a function of ceiling height of the environment 100 and/or ambient temperature of the environment 100.

In some implementations, the thermal gradient of the representation 302 can be set such that the thermal signature of washroom occupants corresponds to the darker sections (e.g., at or including pixel 304) with the lighter sections (e.g., pixel 306) indicating that no occupants are in those sections/areas of the environment 100, as the thermal state of those sections is lower than would be if an occupant was there. Given that occupants have this known (or predefined) thermal signature on the gradient, the darker sections can be correlated with the thermal signature of occupants to map the position of occupants in the environment 100, within some confidence interval.

In some implementations, the thermal sensor 108 is an array of sensors, for example, such as an 8×8 array, and the pixels of the representation 302 correspond to each sensor element of the array 108. Thus the array 108 detects in a 64 element matrix. The thermal data, produced by the sensor 108, can, in this example, include the thermal information (e.g., a temperature or thermal state) from each of these 64 elements. As described above, each of these element can be mapped to a physical location in the environment 100.

The system 102 also includes a data processing apparatus 110. The data processing apparatus 110 can access the data (e.g., thermal data and dispenser event/actuation data) from the washroom controller 106 (or in some implementations directly from the dispensers 104 and sensor 108). The data processing apparatus 110 can analyze the data to determine a number of thermal events over a given time period in the environment 100 (or a portion of the environment 100) based on the thermal data and a number of dispenses from the dispensers 104 based on the dispense event data. In some implementations, the data processing apparatus 110 can be integral or co-located with the washroom controller 106 or it can be remote to the controller 106. For example, in some implementations, the data processing apparatus 110 is realized, at least partially, as a cloud-based service, with wired or wireless communication with the controller 106 and/or thermal sensor 108.

Figure 3C:
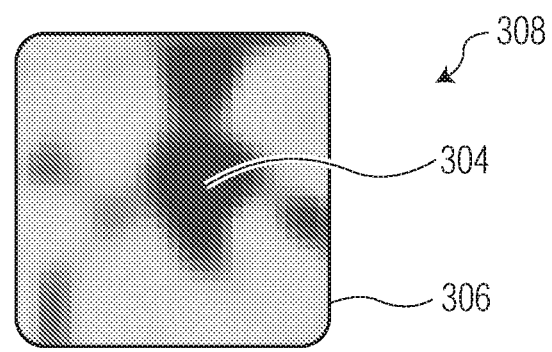
FIG. 3C is a representation of example visualized interpolated thermal data.

As described above, the resolution of the thermal sensor 108 can be limited by the size of its sensor array. To increase the fidelity or resolution of the thermal data the data processing apparatus 110 can apply, for example, interpolation techniques (e.g., linear, bi-cubic or other polynomial interpolation) to the thermal data to generate interpolated thermal data. FIG. 3C is a representation 308 of example visualized interpolated thermal data, which is, for example, a 29×29 array.

Figure 3D:
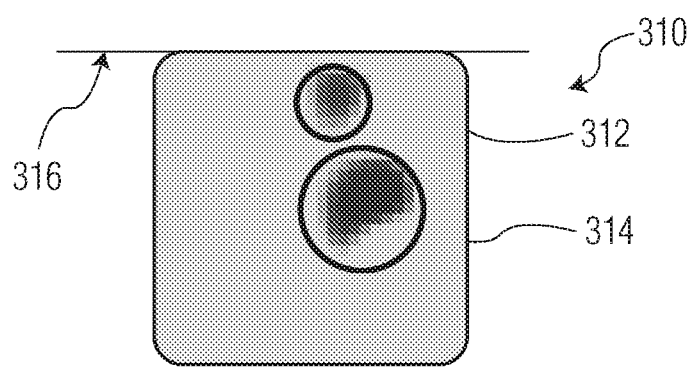
FIG. 3D is a representation of example visualized interpolated thermal data with noise removed.

In some implementations, the data processing apparatus 110 further processes the interpolated thermal data to remove background noise from the data set. FIG. 3D is a representation 310 of example visualized interpolated thermal data with noise removed. The data processing apparatus 110 can remove the noise through any number of techniques such as, for example, non-linear filtering (e.g., median filtering) or using wavelet transforms. By way of example, to remove background noise in the thermal data set, the data processing apparatus 110 can, for each element in the array, compare the value of that element (e.g., temperature) against (i) the average value of the entire array plus (ii) a temperature threshold value (collectively, the "compared value" or "thermal threshold level"). The average value of the elements in the array can be referred to as the average background temperature.

If the element value exceeds (or equals) the compared value then that element can be classified as indicative of occupant presence and it retains its value, and if the element value does not exceed the compared value then that element value can be replaced with a (running) background average value for the array ("analyzed thermal data"). In some implementations, the temperature threshold value can be selected to provide a desired confidence level that the value of an element likely indicates an occupant was in the area corresponding to the analyzed element. The data processing apparatus 110, e.g., through image processing techniques such as edge detection, can group similarly valued elements/pixels to create clusters, and count the clusters. As shown in FIG. 3D, pixel (e.g., element) clusters 312 and 314 are shown in the environment 100. The data processing apparatus 110 can be programmatically instructed to count each cluster (or thermal hot zone) as a respective occupant—so the data processing apparatus 110 determines there were two occupants present at the time the thermal data set was generated.

The thermal sensor 108 can generate thermal data periodically, e.g., every second or minute, and send such data to the data processing apparatus 110 upon request or at specified intervals. In turn, the data processing apparatus 110 can, for example, analyze the thermal data over a given time period to generate sets of analyzed thermal data to describe thermal event traffic over the given time period (e.g., by stitching together the various sets of thermal data in a time-sequenced manner). In some implementations, the thermal sensor 108 can be positioned to detect thermal events at multiple entrances/exits.

The data processing apparatus 110 can, for example, compare clusters or hot zones over time (from different thermal data sets) to determine a length of time or duration that a cluster or thermal hot zone remains in the same space (e.g., section of the environment 100). For example, referring to representation 310, the data processing apparatus 110 can compare thermal data sets at different (but sequential) times to determine how long a cluster 312 remains in the same space. If the data processing apparatus 110 determines that the cluster stays in the same place for an administratively set time period (e.g., twenty minutes) and optionally during a specified time of day (e.g., from 9 pm to 4 am), the data processing apparatus 110 can send an message to a device of a system administrator, as the cluster (representing an occupant) not moving for the specified duration could be an indication that an occupant is in distress.

In some implementations, the thermal sensor 108 is directed to sense the area at and/or proximate the entrance 125 or 316 to the environment 100 and generate thermal data every two seconds (or other specified time period). The data processing apparatus 110 can take that thermal data and generate analyzed thermal data at each same two second interval. For each set of analyzed thermal data the data processing apparatus 110 can determine the number of clusters (e.g., occupants) at the entrance 125 or 316. Assuming that no occupant dwells at the entrance 125 or 316 for more than two seconds (or another set or statistically determined interval) and that the two second interval is frequent enough to capture every occupant entering and leaving through the entrance 125 or 316, the data processing apparatus 110 "counts" the number of clusters at the entrance 125 or 316 for each set of data and aggregates the counts to arrive at a total occupant number (or total number of thermal events). Assuming each occupant entered and left the washroom through the entrance 125 or 316, the data processing apparatus 110 can be programmed to divide the total occupant number by two to determine the number of visits to the environment 100 (a same occupant could visit the environment 100 multiple times each counting as a determined visit).

In some implementations, system 102 can reduce the energy consumption of the dispensers 104 by causing the dispensers 104 to power down during periods of environment 100 inactivity (e.g., when no occupants are in the environment 100) to save energy (e.g., battery energy of the dispensers 104). For example, in response to the data processing apparatus 110 determining that there have been no thermal events in the environment 100 for a set period of time (e.g., fifteen minutes), the data processing apparatus 110 instructs (e.g., through the controller 106) the dispensers 104 to enter a low energy state (a state in which the dispensers 104 cannot dispense).

However, when an occupant enters the environment 100 it's likely the occupant will use a dispenser 104 so the dispensers 104 must be instructed to return to an active state (e.g., a state in which the dispensers 104 dispense in normal operation) from the low energy state. For example, in response to determining a thermal event at the entrance 125 or 316 (and after the dispensers 104 have been instructed to enter the low energy state), the data processing apparatus 110 instructs the washroom controller 106 to cause the dispensers 104 to enter the active state. In this way the system 102 can reduce the energy consumption of dispensers 104 in the environment 100 without adversely affecting the occupants' experience with the dispensers 104.

In some implementations, the data processing apparatus 110 provides the data describing the number of occupants in the environment 100 during a given time period and the number of dispense events during that same time period to a display device (e.g., a monitor or smart phone) for display to a user.

Occupant visits to a washroom (e.g., environment 100) generally involve use of a dispenser 104, whether it be a bath tissue dispenser 104, a paper towel dispenser 104, a soap/sanitizer dispenser 104 or the like. So if the number of occupant visits is high but dispenser use is statistically low, then it can be inferred that there may be a malfunctioning dispenser(s) 104, which is resulting in the abnormally low dispenser use profile. Thus, given a statistical measure quantifying the relationship between dispenser use and occupant visits (e.g., from a pre-existing analysis of washroom use) (the "statistical relationship"), the data processing apparatus 110 can be programmed to infer dispenser malfunctions. Such malfunctions can be, for example, a paper jam, a depleted battery or a no consumable product state (i.e., the dispenser 104 is out of consumable product). In some implementations, the data processing apparatus 110, compares the number of dispense events to the number of occupants over a given time period. And, in response to determining that the number of occupants differs from the number of dispense events by a predetermined measure (e.g., based on the statistically relationship), the data processing apparatus 110 provides a communication specifying that one or more dispensers 104 malfunctioning. Thus, in some implementations, the data processing apparatus 110 determines a possible dispenser 104 malfunction has occurred, and sends a message to an attendant (e.g., via the attendant's mobile device/smart phone).

Embodiments

Embodiment 1. A system for use in a washroom, wherein the washroom has an entrance, the system comprising a washroom controller configured to communicate with one or more hygiene dispensers in the washroom; a thermal sensor configured detect thermal events at the entrance and communicate data describing the thermal events to the washroom controller; and a data processing apparatus configured to access the data from the washroom controller and analyze the data to determine a number of thermal events over a given time period and a number of dispenses from the at least one of the one or more hygiene dispensers.

Embodiment 2. The system of embodiment 1, wherein the data processing apparatus and washroom controller are part of a same device.

Embodiment 3. The system of embodiments 1 or 2, wherein the thermal sensor comprises an array of infrared sensors.

Embodiment 4. The system of any preceding embodiment, wherein determine a number of thermal events over a given time period comprises comparing the data to a thermal threshold to identify the number of thermal events that exceed the threshold.

Embodiment 5. The system of any preceding embodiment, wherein determine a number of thermal events comprises interpolating the thermal data to generate interpolated thermal data.

Embodiment 6. The system of embodiment 5, wherein determine a number of thermal events comprises removing noise from the interpolated thermal data.

Embodiment 7. The system of embodiment 6, wherein removing noise from the interpolated thermal data comprises determining an average background temperature.

Embodiment 8. The system of any preceding embodiment, wherein the thermal sensor is configured detect thermal hot zones in the washroom and a thermal hot zone is an area in the washroom that has a temperature higher than surrounding areas in the washroom.

Embodiment 9. The system of embodiment 8, wherein the data processing apparatus is configured to analyze the data to determine a number of thermal hot zones.

Embodiment 10. The system of embodiment 8, wherein the data processing apparatus is configured to analyze the data to determine a time duration of one of the thermal hot zones and in response to determining the time duration exceeds a threshold, the data processing apparatus is configured to notify an administrator.

Embodiment 11. The system of any preceding embodiment, wherein in response to a thermal event at the entrance, the washroom controller is configured to activate (e.g., prime soap dispenser or wake a battery operated device) at least one of the one or more hygiene dispensers.

Embodiment 12. The system of any preceding embodiments, wherein the entrance is a door.

Embodiment 13. The system of any embodiments 1-11, wherein the entrance is an open threshold.

Embodiment 14. A method comprising communicating, from a hygiene dispenser in a washroom to a washroom controller, use data describing dispense events from the hygiene dispenser, wherein a dispense event defines an actuation of the dispenser to dispense consumable product; detecting, by a thermal sensor, thermal events proximate an entrance of the washroom; communicating, from the thermal sensor to the washroom controller, thermal data describing the thermal events; analyzing the use data and thermal event data to determine a number of dispense events and a number of occupants that entered in the washroom; and displaying the number of dispense events and occupants.

Embodiment 15. The method of embodiment 14, wherein the entrance is a door.

Embodiment 16. The method of embodiment 14, wherein the entrance is an open threshold.

Embodiment 17. The method of any of embodiments 14-16, wherein the thermal sensor comprises an array of infrared sensors.

Embodiment 18. A method comprising communicating, from a hygiene dispenser in a washroom to a washroom controller, use data describing dispense events from the hygiene dispenser, wherein a dispense event defines an actuation of the dispenser to dispense consumable product; detecting, by a thermal sensor, thermal events proximate an entrance of the washroom; communicating, from the thermal sensor to the washroom controller, thermal data describing the thermal events; analyzing the use data and thermal event data to determine a number of dispense events and a number of occupants that entered in the washroom; and comparing the number of dispense events to the number of occupants; and in response to determining that the number of occupants differs from the number of dispense events by a predetermined measure, providing a communication specifying that the hygiene dispenser may be malfunctioning.

Implementations of the subject matter and the operations described in this specification can be implemented, at least in part, in digital electronic circuitry, or in computer software, firmware, or hardware, including the structures disclosed in this specification and their structural equivalents, or in combinations of one or more of them. Implementations of the subject matter described in this specification can be implemented, at least in part, as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus or system on data stored on one or more computer-readable storage devices or received from other sources.

The term data processing apparatus encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification, at least in part, can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Implementations of the subject matter described in this specification can be implemented, at least in part, in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a user computer (e.g., for purposes of displaying data to and receiving user input from a user interacting with the user computer). Data generated at the user computer (e.g., a result of the user interaction) can be received from the user computer at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A method comprising:
    communicating, from a hygiene dispenser in a washroom to a washroom controller, use data describing dispense events from the hygiene dispenser, wherein a dispense event defines an actuation of the hygiene dispenser, by a number of occupants that entered in the washroom, to dispense consumable product;
    detecting, by a thermal sensor, thermal events proximate an entrance of the washroom;
    communicating, from the thermal sensor to the washroom controller, thermal data describing the thermal events;
    analyzing the use data and thermal data to determine a number of dispense events and the number of occupants that entered in the washroom, wherein the use data indicates information about expected amount of remaining consumable product after the dispense events; and
    comparing the number of dispense events to the number of occupants; and
    in response to determining that the number of occupants differs from the number of dispense events, including the expected amount of remaining consumable product, by a predetermined measure, providing a communication specifying that the hygiene dispenser is malfunctioning, based on that the expected amount of remaining product is less than or equal to a current amount of the remaining consumable product; wherein the predetermined measure is a statistical measure quantifying a relationship between dispenser use and occupant visits and indicating the period of time the hygiene dispenser has been malfunctioned.

2. The method of claim 1, wherein comparing the number of dispense events to the number of occupants comprises, comparing, by a data processing apparatus, the number of dispense events to the number of occupants.

3. The method of claim 1, wherein the thermal sensor comprises an array of infrared sensors.

4. The method of claim 1, wherein analyzing the use data and the thermal event data comprises interpolating the thermal event data to generate interpolated thermal data.

5. The method of claim 4, wherein interpolating the thermal event data to generate the interpolated thermal data comprises removing noise from the interpolated thermal data.

6. The method of claim 5, wherein removing the noise from the interpolated thermal data comprises determining an average background temperature.

7. The method of claim 1, comprising detecting thermal hot zones in the washroom wherein a thermal hot zone is an area in the washroom that has a temperature higher than surrounding areas in the washroom.

8. The method of claim 7, comprising analyzing, by a data processing apparatus, data to determine a time duration that one of the thermal hot zones has not moved and in response to determining the time duration exceeds a threshold, sending a message to an administrator.

9. The method of claim 1, wherein the entrance is a door.

10. The method of claim 1, wherein the entrance is an open threshold.

* * * * *